United States Patent [19]

Kalley et al.

[11] Patent Number: 5,173,868
[45] Date of Patent: Dec. 22, 1992

[54] SCANNING RADIATION SENSOR FOR MULTIPLE SPOTS AND APPARATUS AND METHOD OF AVERAGING RADIATION SAMPLES OF SAME

[75] Inventors: Eugene F. Kalley, St. Charles; Steven A. Ignatowicz, Wheeling, both of Ill.

[73] Assignee: Square D Company, Palatine, Ill.

[21] Appl. No.: 600,643

[22] Filed: Oct. 19, 1990

[51] Int. Cl.$^5$ .................... G06F 15/20; G01K 3/02
[52] U.S. Cl. .................... 364/557; 364/575; 374/121; 374/137
[58] Field of Search ............ 374/100, 120, 121, 137, 374/124, 130; 250/338.1, 338.3, 340, 341, 342, 327.2, 484.1; 364/557, 575, 413.03; 358/113

[56] References Cited

U.S. PATENT DOCUMENTS

| | | | |
|---|---|---|---|
| 4,566,808 | 1/1986 | Pompei et al. | 374/121 X |
| 4,576,485 | 3/1986 | Lambert | 374/130 |
| 4,690,569 | 9/1987 | Veitch | 364/557 X |
| 4,733,175 | 3/1988 | Levinson | 374/137 X |
| 4,737,917 | 4/1988 | Perron | 374/137 X |
| 4,813,003 | 3/1989 | Cox et al. | 364/557 |
| 4,840,496 | 6/1989 | Eueman et al. | 374/130 X |
| 4,896,281 | 1/1990 | Mack | 374/121 X |
| 4,914,608 | 4/1990 | LeBihan et al. | 364/557 |

Primary Examiner—Kevin J. Teska
Attorney, Agent, or Firm—Michael J. Femal; James W. Potthast; Richard J. Graefe

[57] ABSTRACT

A scanning radiation sensor (10) for individually determining temperature of a plurality of spots (16') along a scan line (16) on a target (12) responds to inputs to a light marking apparatus (21, 29, 40, 21) to determine which of a plurality of samples produced during a scan cycle are to be selected for averaging (54, 54'). Averages are determined for each scan (54, 54') and then averages for each scan are averaged over multiple scans (56). Both spot target samples (Ts) and reference source samples (Rs) are averaged for improved accuracy, with target samples being converted to temperatures (52) before averaging.

26 Claims, 3 Drawing Sheets

SCANNING RADIATION SENSOR FOR MULTIPLE SPOTS AND APPARATUS AND METHOD OF AVERAGING RADIATION SAMPLES OF SAME

TECHNICAL BACKGROUND

The invention relates generally to a scanning radiation sensor and, particularly, to such a sensor with the capability of individually measuring and concurrently providing read out of radiation from a plurality of spots on a target and apparatus and methods of measuring radiation from such spots by sample averaging techniques.

Scanning radiation sensors which scan a target and average a plurality of radiation samples from a plurality of points along a scan line on a target to determine the average radiation from the target are known. Some scanning radiation sensors use a beam of laser light to mark the scan line. Such scanning radiation sensors, while having the ability of marking the line being scanned, are incapable of marking spot targets along the line for individual measurement.

Another problem with known scanning radiation sensors is that while they are capable of averaging multiple samples which improve accuracy, the known techniques and methods of averaging achieves less than optimal accuracy.

Moreover, known techniques in scanning radiation sensors which are used to determine average temperature of remote targets through averaging of multiple radiation samples fail to obtain maximum accuracy in conversion of the average radiation sample to indications of temperature.

SUMMARY OF THE INVENTION

It is therefore the principal object of the present invention to provide a scanning radiation sensor ard method of scanning in which the aforementioned disadvantages of known scanning sensors are overcome. This object is partly achieved by individually measuring the radiation of each of a plurality of spot targets in response to means for selectively marking with light the spot targets and by averaging radiation samples over multiple scans, by converting samples to representations of temperature before averaging and by other means which will be made apparent from the objectives below and from the following description of the preferred embodiment.

It is therefore an objective to provide a scanning radiation sensor with means for selectively marking with light a number of spots on a target for discrete temperature measurement and means responsive to said selectively marking means for individually measuring the radiation of each of said selected spots.

A further objective is to provide a scanning radiation sensor for concurrently determining the temperature of a plurality of spots on a target with means for producing at least one radiation sample for each spot for each scan and means for averaging the at least one sample over multiple scans to determine average radiation for each spot.

Yet another objective is to provide a scanning radiation sensor having a reference source for concurrently determining the radiation of a plurality of spots on a target with means for producing at least one radiation sample for each spot, means for producing a plurality of radiation samples for the reference source, means for averaging the plurality of radiation samples of the reference to determine an average reference radiation and means responsive to the average reference radiation to determine the radiation of each of said spots relative to the average reference radiation.

Still another objective is to provide a method of measuring radiation with a scanning radiation sensor comprising the steps of selecting a number of spots at spaced locations along a preselected scan line segment for discrete temperature measurement, producing a plurality of samples for each of said selected number of spots during a scan thereof, and averaging the samples produced during a scan for a spot to produce an average temperature for the spot during a scan.

Yet, a further objective is to provide a scanning radiation sensor having a reference source including a radiation determining means for concurrently determining the radiation of a plurality of spots on a target with means for producing at least one radiation sample for each spot, means for producing at least one radiation sample for the reference source, means for averaging the plurality of radiation samples of the reference over multiple scans to determine an average reference radiation and means corrected by the average reference radiation to determine the radiation of each of said spots in accordance with the average reference radiation.

Still another objective is to provide a method of determining the temperature of a target source of radiation comprising the steps of obtaining a plurality of samples of radiation from the target, converting selected ones of said samples to representations of sample temperature, and averaging the representation of sample temperature to develop an average representation of temperature of the target.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which.

DESCRIPTION OF THE PREFERRED EMBODIMENT

Figure 1:
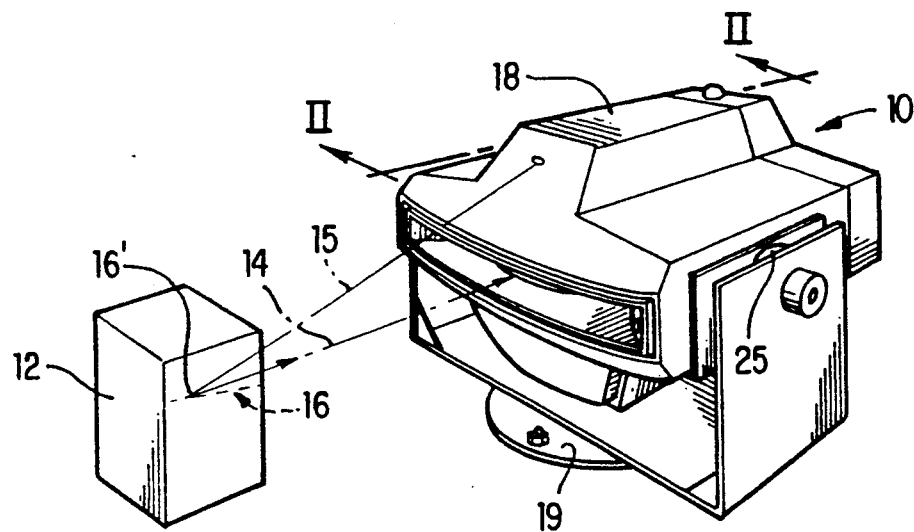
FIG. 1 is a perspective view of the preferred embodiment of the scanning radiation sensor of the present invention.

Referring to FIG. 1, the preferred embodiment of the scanning radiation sensor 10 of the present invention is illustrated marking an exemplary target 12, such as a section of hot steel, plastic or glass, with a beam 14 of visible light along a line 16 on the target.

In the spot mode of operation, the marking line 16 comprises a series of spots or spot targets 16', or relatively short line segments, from which radiation and corresponding temperature will be individually determined. In a continuous mode of operation, the marking line 16 is substantially continuous over its length along which the average radiation will be determined. Radiation from the target 12 passes to the sensor 10 along the same path as the beam 14.

Figure 3A:
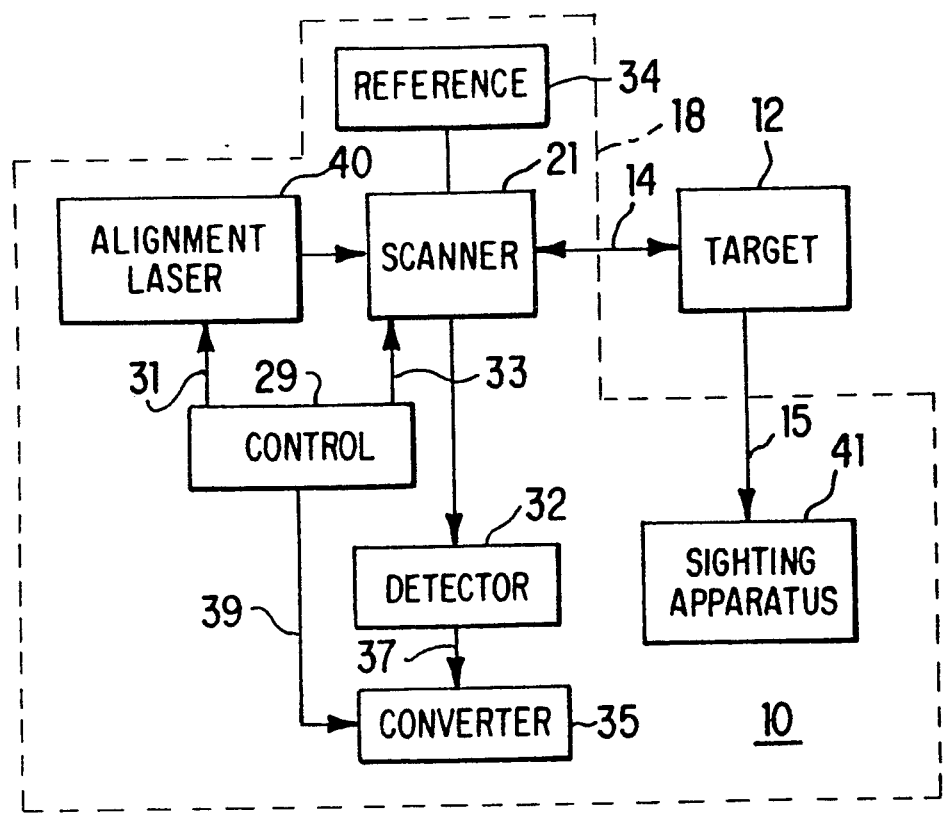
FIG. 3A is a functional block diagram of the various parts of the scanning radiation sensor of FIG. 1 which relate to the invention.

The light from beam 14 which is reflected off of the target 12 at line 16 returns to the radiation sensor 10 along an optical path 15 and is detected by a sighting apparatus 41, FIG. 3A, within a housing 18 of the sensor 10. Preferably, the sighting apparatus includes a filtered camera as described in U.S. Pat. No. 5,085,525, granted Feb. 4, 1992, Ser. No. 07/635,050, of Bartosiak et al. filed contemporaneously herewith and entitled "Scanning Infrared Temperature Sensor With Sighting Apparatus". Alternatively, the light marks on the spot targets are viewed directly without a camera.

During aiming of the sensor 10, the housing 18 is physically moved on a vertical swivel assembly connected to a base 19 and mounted on a horizontal swivel assembly 25 to move the marking line 16 until it is positioned on the target 12 at the precise location, or locations, on the target from which it is desired to sense the radiation. Control inputs, such as manual control inputs, enable an operator to select the number, length and relative location of each of the spot targets 16', One of the objectives of the invention is achieved by utilizing those control inputs employed to select the spot target as inputs to a control for determining which of a plurality of radiation samples collected over the entire length of marking line 16 will be selected to individually determine the average radiation and average temperature of each of the spots 16'.

Figure 2:
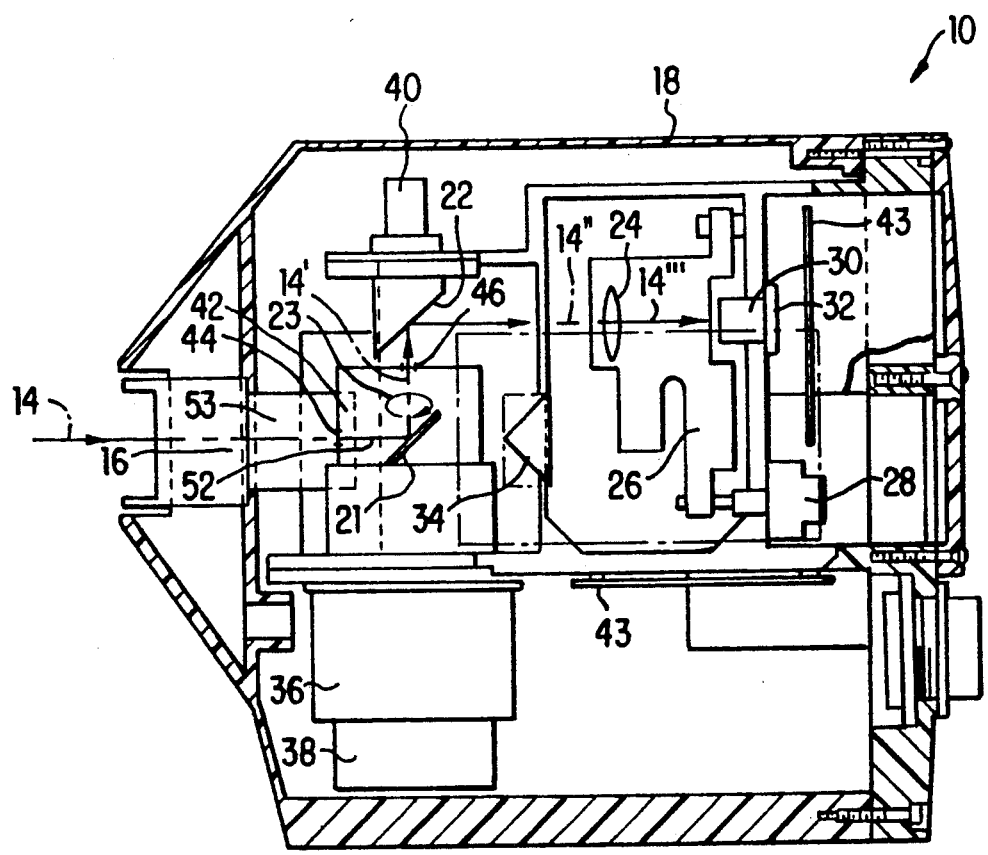
FIG. 2 is a sectional side view of the scanning radiation sensor taken along a vertical plane through section line II—II of FIG. 1.

Referring to FIG. 2, the scanning mechanism includes a rotating reflective member 21, such as a planar scanning mirror, which rotates about a vertical axis in the direction of arrow 23. The scanning mirror 21 is tilted at an angle of forty-five degrees to reflect the radiation 14 received through a baffle opening 16 along a vertical radiation path 14' to a fixed, folding mirror 22. Folding mirror 22 redirects the radiation along a horizontal path 14" to an objective lens 24. Objective lens 24 is part of a telescopic focusing lens assembly 26 having a focus drive motor 28. The light passes through the lens 24 along a path 14" and through a filter assembly 30 to impinge upon a detector, or sensing element, 32. The sensing element 32 is preferably a photoelectrical converter, such as a cadmium telluride photoconductor or photodiode.

The housing 18 also protectively encloses all the other parts of the sensor. A cold reference source 34, such as a piece of copper or other element whose ambient, or case, temperature is independently measured for use in making corrections in the conversion of the radiation signal from sensing element 32 to an indication of temperature is enclosed. A relatively hot reference source (not shown) is also provided. A motor 36 rotates the mirror 21, and an encoder 38 rotates with the motor 36 to indicate the angular position of the scanning mirror 21 for synchronization and sample location control purposes. Also a solid state alignment laser 40 is provided to mark the target with light for purposes of sighting the scanning radiation sensor 10 on the target 12 and locating the spot targets 16' as noted above. Various circuits for operation of the sensor, described below, are mounted on printed circuit boards 43. Mirror 21 is contained within a cup shaped baffle 42 which rotates with the mirror during the scanning operation. The scanning mirror 21 and the baffle member 42 rotate at a speed between ten rps and fifty rps.

A window opening 44 in a vertical cylindrical side wall of the movable baffle 42 is radially aligned with the scanning mirror 21 to enable passage of light to enter the interior of movable baffle 42 and impinge on scanning mirror 21. The light impinges on the mirror 21 and thus on sensing element 32, only if it is aligned with a sensing line 52 extending between the window opening 44 and the scanning mirror 21 along which the scanning mirror 21 is directed and thus along which the sensing element 32 senses, or "looks". The walls of the baffle 42 block light to the mirror 21 and thus to the sensing element 32 from any other direction not aligned with the sensing line 52. An axial opening 46 in the top of the movable baffle member is provided for passage of light along path 14'. If further details of the structure and relative locations and general operation of the scanner 19, alignment laser 40 and control 29 are desired, reference should be made to U.S. patent Ser. No. 07/600,638 of Sam Paris entitled "Scanning Radiation Sensor With Movable Baffle Assembly and Method of Sensing", filed on Oct. 19, 1990, contemporaneously herewith, and which has been assigned to the assignee of this application.

Referring now to FIG. 3A, also contained within housing 18 are a converter 35 which receives radiation samples on a line 37 and a scanner and alignment laser control 29. The scanner, or scanning mirror, 21 and the alignment laser 40 are operated by the control 29 to mark the spot targets 16' and to indicate on line 43 the appropriate samples from detector 32 for averaging for each spot target 16' by converter 35.

Figure 3B:
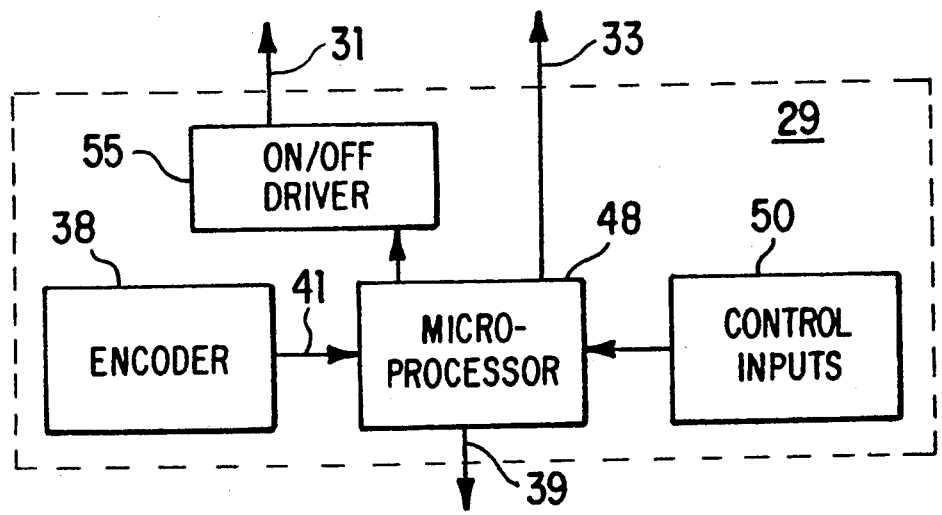
FIG. 3B is a block diagram of the control circuit block of FIG. 3A.

Referring now to FIG. 3B, the control circuit 29 includes a microprocessor 48 which responds to either manual or automatic control inputs 50 and inputs from the rotary encoder 38 to control an on/off driver circuit 55 and to provide control inputs for the scanner 21 on scanner controller output 33. The rotary encoder 38 rotates with the rotating mirror 21 or other scanning element within the scanner 21 to provide an indication of the precise direction in which the sensor 10 is "looking", or directed, for infrared radiation and for marking the target 12.

One objective of the invention is achieved in part by means of the on/off driver circuit 55 which selectively applies power to, and removes power from, the alignment laser 40 so that the selected plurality of spot targets 16' are marked on the target 12 at which individual temperatures are to be determined after sighting has been accomplished. The scanner 21 operates at a constant speed in a range between ten rps and fifty rps. Samples of radiation are taken at a rate of eighty KHz, and in order for the spot target marks 16' to be produced, the on/off cycles of the alignment laser 40 must operate at half this sampling rate. This is preferably achieved in accordance with the present invention through use of a solid state laser.

Figure 4A:
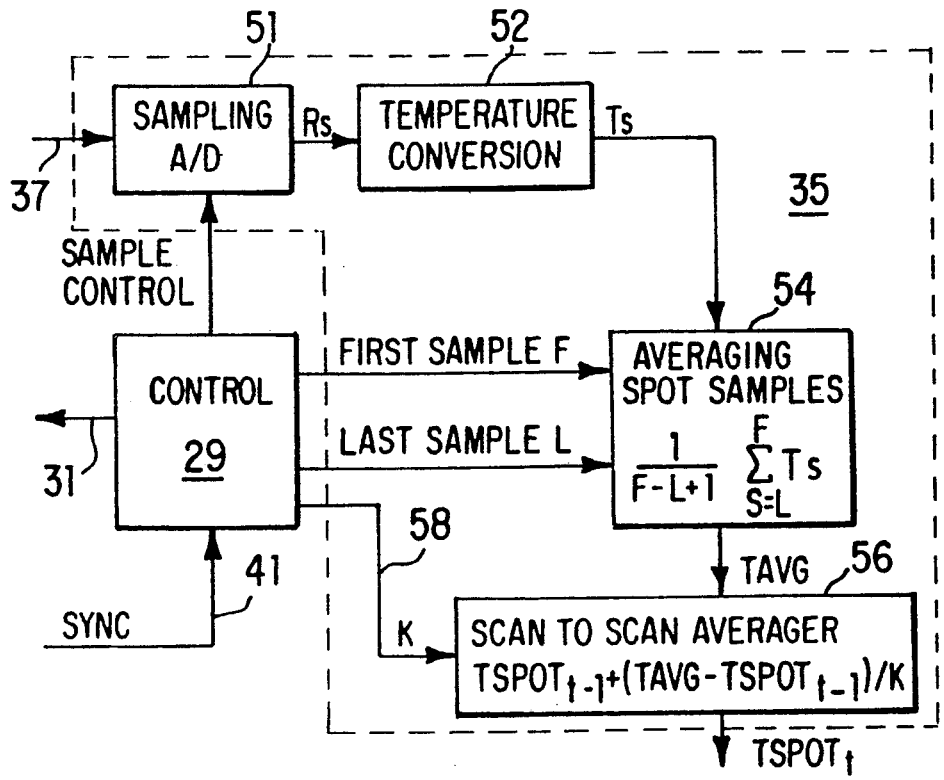
FIG. 4A is a functional block diagram of the converter of FIG. 3A when used to convert detector radiation detector signals from the target to average temperature from a plurality of spots.

Referring now to FIG. 4A, all the radiation samples from the detector 32, FIG. 3A, on line 37 are applied to a sampling analog to digital, or A/D, converter 51 which produces radiation samples Rs that are digital representations of the radiance of each sample. The radiance samples Rs are applied to a termperature conversion circuit 52 or a microprocessor which converts each of the radiance samples Rs from the target 12 to a corresponding temperature sample Ts. Sample Ts is a digital representation of the temperature of each sample corresponding to its radiance. Selected ones of these temperature samples Ts between the first sample F and the last sample L for each selected spot target 16' are then averaged at 54 according to the algorithm $$T_{AVE} = \frac{1}{F-L+1} \sum_{S=L}^{F} Ts$$

The location of the first sample F and the last sample L are provided to the averaging algorithm at 54 from the microprocessor 48 of the control 29 on line 39.

As previously indicated, the first and last samples are determined by means of the control inputs 50 to the microprocessor 48, FIG. 3B which control the on/off driver 55 to mark the selected spots 16' on the target. A sync pulse on line 41 from encoder 38 is used to identify these sample locations. Thus, once the spots 16' have been marked with the alignment laser 40, the first and last samples corresponding to the spot are also determined for computation of the average temperature TAVG produced by the sample averaging algorithm at 54.

Achieving another objective of the invention, the average temperature for such spot, TAVG, is applied to another algorithm at 56 which averages the average temperature during each scan over multiple scans. This is accomplished over multiple scans according to the algorithm $$TSPOT_t = TSPOT_{t-1} + (TAVG - TSPOT_{t-1})/K$$

where TSPOT is the temperature of the spot 16' and K is a filter constant provided by the control 29 on line 58. Thus, the samples Ts are thereby averaged over multiple scans.

Figure 4B:
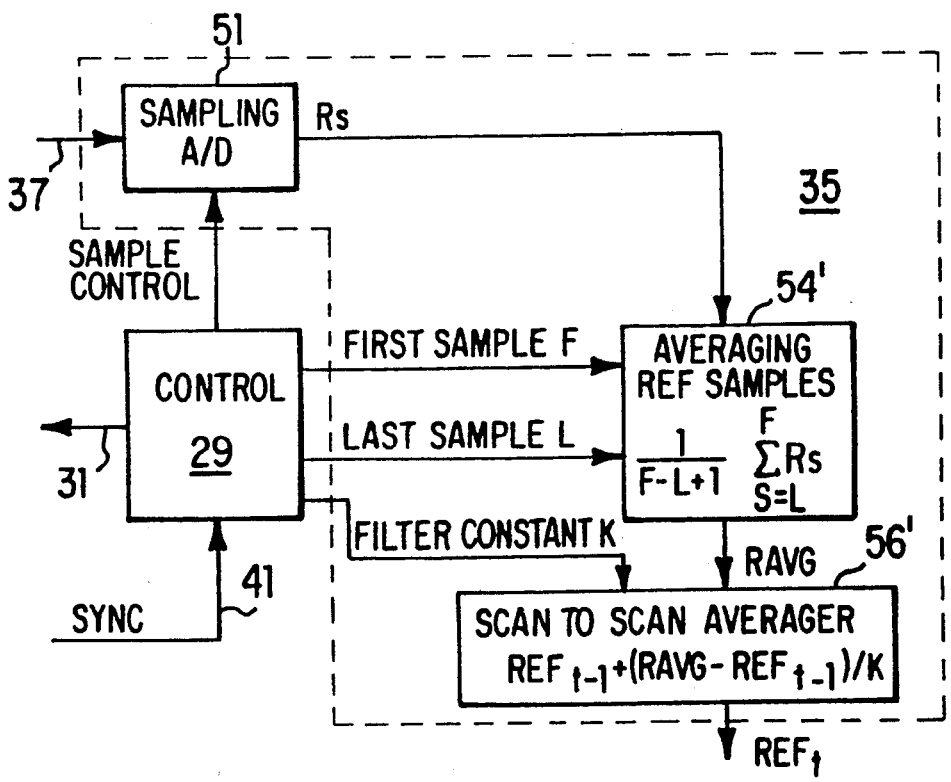
FIG. 4B is a functional block diagram of the converter of FIG. 3A when used to convert detector signals from a reference source to average radiation.

Referring to FIG. 4B, the converter operates in substantially the same way as described above with respect to FIG. 4A, except the temperature conversion is eliminated. Instead the average radiance for the reference 34, FIG. 3A, and another hot reference (not shown) are determined to make corrections in the temperature conversion process at 52. The averaging algorithm can be shared between spot and reference averaging by selecting Rs or Ts as an input. In the case of FIG. 4B, the algorithm 54' is therefore $$R_{AVG} = \frac{1}{F-L+1} \sum_{S=L}^{F} Rs$$

Accordingly, the scan to scan averager 56' produces the average radiance according to the equation $$REF_t = REF_{t-1} + (RAVG - REF_{t-1})/K$$

Generally speaking, the algorithm at 54 is defined by the equation $$PR = \frac{1}{N-2} \cdot \sum_{n=2}^{N-1} S_n$$

where $$SPOT_t = SPOT_{t-1} + (PR - SPOT_{t-1})/K$$

PR is the present spot reading;
$S_n$ is the individual sample point;
N is the number of samples in the spot;
SPOT is the integrated spot reading;
t is the present time;
t−1 is the previous sampling (scan) time;
K is the response time factor; and
K = ⅓ (Response Time*Scanner Frequency + 1.5) seconds.

While a detailed description of the preferred embodiment of the invention has been given, it should be appreciated that many variations can be made thereto without departing from the scope of the invention as set forth in the appended claims.

We claim:

1. In a scanning radiation sensor, the improvement comprising:
   a. means for selectively marking with light a number of spots on a radiating target and for generating a plurality of marked spots from said spots for discrete temperature measurement of the target; and
   b. means responsive to said selectively marking means for concurrently individually measuring the radiation of each of said selected spots on the target for conversion to indications of temperature.

2. The scanning radiation sensor of claim 1 in which said measuring means includes
   a. a radiation sensing scanning system for producing a plurality of samples of radiation from the target,
   b. means responsive to said selective marking means for selecting from the plurality of samples at least one sample which corresponds to each of said marked spots, and
   c. means for determining the radiation of each of said marked spots from the at least one sample corresponding to each of said marked spots.

3. The scanning radiation sensor of claim 2 in which the
   a. the selectively marking means includes means for varying the relative locations of the plurality of marked spots, and
   b. said sample selecting means includes means for varying the samples selected relative to the various locations of the plurality of marked spots.

4. The scanning radiation sensor of claim 2 in which the number of samples selected by said selecting means for each marked spot is a plural number, and further including
   a. a controlling means for averaging the plural samples for each of said marked spots.

5. The scanning radiation sensor of claim 4 in which
   a. the selecting means includes means for selecting different locations for each of said marked spots, and
   b. said controlling means further includes means for controlling the selection of samples relative to the locations of the plurality of marked spots.

6. The scanning radiation sensor of claim 4 in which said averaging means includes
   a. means for converting said multiple radiation samples to samples representing temperature, and
   b. means for averaging the temperature representing samples to determine an average temperature for each of said marked spots.

7. The scanning radiation sensor of claim 4 in which a. said controlling means includes means for varying the size of each of the selected spots, and
b. said controlling means includes a means for controlling the selection of samples proportional to the size selected for each marked spot.

8. The scanning radiation sensor of claim 7 in which the controlling means includes means for selectively changing the number of samples for a marked spot proportional to the size of the spot.

9. The scanning radiation sensor of claim 1 in which said radiation measuring means includes means responsive to said selectively marking means to produce multiple samples for each of said marked spots.

10. The scanning radiation sensor of claim 9 in which said radiation measuring means includes means for averaging the radiation represented by said multiple samples for each of said marked spots.

11. The scanning radiation sensor of claim 10 in which said radiation sample averaging means includes means for determining the average radiation for each of said marked spots from multiple radiation samples of a spot selected therefor during a single scan.

12. The scanning radiation sensor of claim 10 in which said average radiation determining means includes means for averaging the radiation determined for each scan during multiple scans.

13. The scanning radiation sensor of claim 10 in which said radiation averaging means includes means for determining the average radiation for each of said marked spots from multiple radiation samples of each marked spot selected therefor during multiple scans.

14. The scanning radiation sensor of claim 10 including means for discarding at least one preselected sample from a group of samples produced during a scan of a marked spot prior to averaging the samples for the marked spot.

15. The scanning radiation sensor of claim 14 in which said at least one preselected sample which is discarded is adjacent to an edge of the marked spot.

16. The scanning radiation sensor of claim 15 in which said sample discarding means discards the samples respectively adjacent to a pair of edges of the marked spot.

17. A method of measuring radiation with a scanning radiation sensor, comprising the steps of:
a. selecting a number of spots at spaced locations along a preselected scan line segment for discrete temperature measurement;
b. varying the size of each of said number of spots;
c. producing a plurality of radiation samples for, and in accordance with the size of, each of said selected number of spots during a scan of said preselected scan line segment;
d. converting said radiation samples to representations of radiation of said radiation samples;
e. converting said representations of radiation of said radiation samples to representations of temperature of said radiation samples;
f. generating an average temperature for said representations of temperature of said radiation samples produced during a scan of said selected number of spots to produce an average temperature for each of said selected number of spots during said scan.

18. The method of claim 17 in which the average temperature for each of said selected number of spots is further processed with the average temperatures from successive scans through a digitized summing algorithm.

19. The method of claim 18 in which said summing algorithm is described by the equation $$SPOT_t = SPOT_{t-1} + (PR - SPOT_{t-1})/K$$

where $$PR = \frac{1}{N-2} \cdot \sum_{N=2}^{N-1} Sn$$

and where
PR is the present spot reading;
Sn is the individual sample point;
N is the number of samples in the spot;
SPOT is the integrated spot reading;
t is the present time;
t−1 is the previous sampling (scan) time;
k is the response time factor; and
K = ⅓ (Response Time × Scanner Frequency + 1.5) seconds.

20. In a scanning radiation sensor having at least one reference source and a radiation determining means for concurrently determining the radiation of a plurality of spots on a target, said scanning radiation sensor comprising:
a. means for selectively marking with light a number of spots on said target to form said plurality of spots;
b. means for producing a plurality of radiation samples for each of said plurality of spots;
c. means for producing a plurality of radiation samples for the reference source;
d. means for averaging the plurality of radiation samples of said reference source over multiple scans to determine an average reference radiation; and
e. means corrected by the average reference radiation to determine the radiation of each of said plurality of spots with respect to the average reference radiation.

21. The scanning radiation sensor of claim 20 in which the spot radiation sample producing means includes
a. means for sensing the radiation from each of said selectively marked number of spots;
b. means for converting each of said sensed radiation from each of said selectively marked number of spots to samples of radiation;
c. means for producing multiple samples of radiation, and
d. means for averaging the multiple samples of radiation to determine an average radiation for each spot.

22. The scanning radiation sensor of claim 20 in which the reference radiation sample averaging means includes
a. means for determining the average reference radiation for each scan, and
b. means for averaging the average reference radiation over multiple scans.

23. In a scanning radiation sensor, a method of determining the temperature of a target source of radiation, comprising the steps of:
a. marking a scan line on the target with a plurality of spots;
b. obtaining a plurality of samples of radiation from each of said plurality of spots;

c. converting selected ones of said samples of radiation to representations of sample radiance for each of said plurality of spots;
d. converting said representations of sample radiance for each of said plurality of spots to representations of sample temperature; and
e. averaging the representations of sample temperature to develop an average representation of temperature of the target.

24. The method of claim 23 in which a plurality of samples of radiation are selected from each scan for conversion to representations of sample temperature.

25. The method of claim 23 in which a plurality of radiation samples of the target obtained over a plurality of scans are converted to representations of sample temperature before averaging.

26. The method of claim 23 including the steps of:
a. obtaining radiation samples from a plurality of targets during each scan of the sensor, and
b. converting selected ones of the samples for each of the plurality of targets to representations of sample temperature before averaging to develop an average representations of temperature.

* * * * *